(12) United States Patent
Chien

(10) Patent No.: US 10,215,223 B2
(45) Date of Patent: Feb. 26, 2019

(54) NON-CONTACT BEARING

(71) Applicant: METAL INDUSTRIES RESEARCH&DEVELOPMENT CENTRE, Kaohsiung (TW)

(72) Inventor: Kuo-Yu Chien, Kaohsiung (TW)

(73) Assignee: METAL INDUSTRIES RESEARCH&DEVELOPMENT CENTRE, Kaohsiung (TW)

( * ) Notice: Subject to any disclaimer, the term of this patent is extended or adjusted under 35 U.S.C. 154(b) by 0 days.

(21) Appl. No.: 15/720,215

(22) Filed: Sep. 29, 2017

(65) Prior Publication Data

US 2018/0087566 A1   Mar. 29, 2018

Related U.S. Application Data

(60) Provisional application No. 62/401,349, filed on Sep. 29, 2016.

(51) Int. Cl.
*F16C 32/06* (2006.01)
*F16C 17/02* (2006.01)
*F16C 33/10* (2006.01)

(52) U.S. Cl.
CPC ............ *F16C 17/026* (2013.01); *F16C 32/06* (2013.01); *F16C 33/104* (2013.01)

(58) Field of Classification Search
CPC .......... F16C 17/02; F16C 32/06; F16C 33/104
See application file for complete search history.

(56) References Cited

U.S. PATENT DOCUMENTS

| | | | | |
|---|---|---|---|---|
| 5,098,203 | A | * | 3/1992 | Henderson .......... F16C 32/0614 384/100 |
| 5,238,308 | A | * | 8/1993 | Lang ...................... F16C 25/02 277/411 |
| 5,407,280 | A | * | 4/1995 | Heinzl .................. B82Y 15/00 384/100 |
| 6,990,737 | B2 | * | 1/2006 | Zywno ................. B25B 11/005 29/898.02 |
| 9,920,790 | B2 | * | 3/2018 | Jiang ................... F16C 32/0614 |
| 2005/0211505 | A1 | | 9/2005 | Kroupenkine et al. |
| 2011/0159446 | A1 | | 6/2011 | Boutaghou |

* cited by examiner

*Primary Examiner* — Thomas R Hannon
(74) *Attorney, Agent, or Firm* — WPAT, PC

(57) ABSTRACT

A non-contact bearing is provided. In a suspended state, the non-contact bearing is disposed with a predetermined spacing to a first guide surface. The non-contact bearing includes: a bearing body and a micro electro mechanical layer. The bearing body includes a second guide surface, wherein the second guide surface is opposite to the first guide surface. The micro electro mechanical layer is disposed on the second guide surface, and includes at least one micro sensor and/or at least one micro actuator.

20 Claims, 14 Drawing Sheets

NON-CONTACT BEARING

CROSS-REFERENCE TO RELATED APPLICATION

This application claims the benefit of U.S. Provisional Patent Application No. 62/401,349, filed on Sep. 29, 2016, which is hereby incorporated by reference for all purposes as if fully set forth herein.

BACKGROUND

Technical Field

The present disclosure relates to a bearing, and in particular to a non-contact bearing whose surface is provided with at least one micro sensor and/or at least one micro actuator.

Related Art

A bearing is an apparatus applied to a rotating mechanism or a moving mechanism, to support, reduce friction, and bear load, for example, applied to a spindle motor. With increasing improvement of technologies, parts are relatively smaller and more precise, but relatively higher precision of bearings is required. Generally, a most common bearing whose precision is required is a ball bearing, but the ball bearing has some problems, including high noise, insufficient rotation precision, and excessively high costs for miniaturization, and cannot meet miniaturization and precision requirements. To achieve the foregoing requirements, and further reduce rotating friction, a fluid bearing or a magnetic bearing emerges, which has high precision, low noise, and strong shock resistance.

The fluid bearing is roughly classified into two types: a fluid hydrostatic bearing and a fluid hydrodynamic bearing. The fluid hydrostatic bearing has a fluid lubricating medium inside the bearing in a normal state, during rotating. A pressure of a fluid can be used to support an axis, and if the axis deviates, the pressure is added on the deviated side to return the axis to a correct position. The fluid hydrodynamic bearing has a small groove in a hole part inside the bearing, the inside of the small groove has a lubricating medium, and when an axis is rotating, and the lubricating medium inside the small groove is pulled and pressed to generate a dynamic pressure, to support the axis at a central position. The fluid hydrostatic bearing can be classified into a gas hydrostatic bearing and a liquid hydrostatic bearing, and the fluid hydrodynamic bearing can be classified into a gas hydrodynamic bearing and a liquid hydrodynamic bearing.

However, using the fluid hydrostatic bearing as an example, in an existing measurement technology, it is well-known that a sensor is disposed on a measurement component being independent of the fluid hydrostatic bearing, and only single-point measurement can be performed indirectly on an outside of the bearing, but no correct and sufficient data can be obtained from a surface of the bearing in real time and directly for monitoring and analyzing, and no feedback control adjustment policy can be provided.

In view of this, therefore, it is necessary to provide a non-contact bearing to resolve the foregoing problem.

SUMMARY

The main objective of the present disclosure is to provide a non-contact bearing whose surface is disposed with at least one micro sensor and/or at least one micro actuator.

To achieve the foregoing objective, the present disclosure discloses a non-contact bearing, wherein in a suspended state, the non-contact bearing is disposed with a predetermined spacing to a first guide surface, and the non-contact bearing comprises: a bearing body, comprising a second guide surface, wherein the second guide surface is opposite to the first guide surface; and a micro electro mechanical layer, disposed on the second guide surface, and comprising at least one micro sensor and/or at least one micro actuator.

During measurement, multiple micro sensors and/or multiple micro actuators of the present disclosure are disposed on a surface (that is, a guide surface) of a non-contact bearing, and thus: (1) by means of the micro sensors, correct and sufficient data can be obtained from the surface of the non-contact bearing in real time and directly for monitoring and analyzing, and (2) by means of the micro actuators, a feedback control adjustment policy can be performed on the surface of the non-contact bearing.

To make the foregoing and other objectives, features, and advantages of the present disclosure more obvious, the following provides description in detail as follows with reference to the accompanying drawings.

DETAILED DESCRIPTION

Figure 1A:
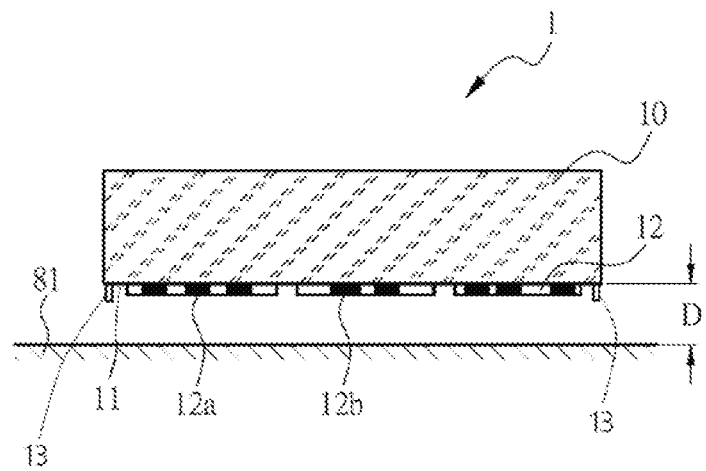
FIG. 1a is a schematic sectional view of a non-contact bearing of an embodiment of the present disclosure.
Figure 1B:
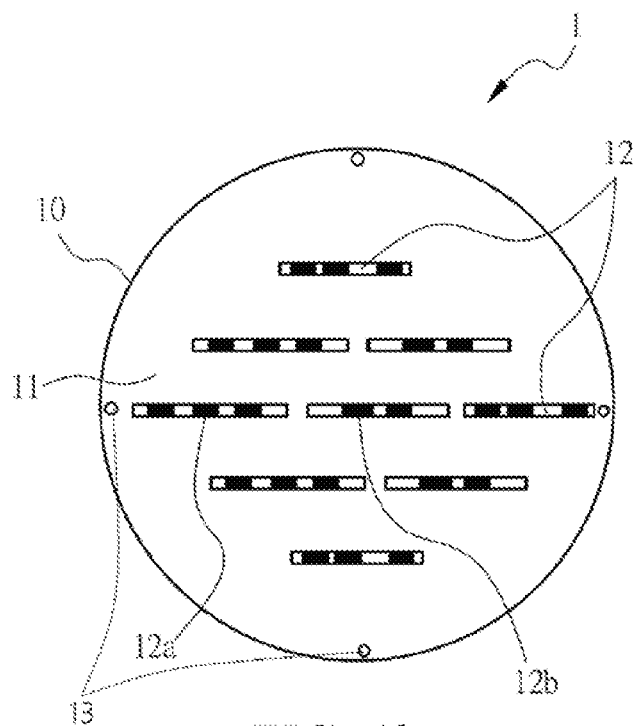
FIG. 1b is a schematic plan view of a non-contact bearing of an embodiment of the present disclosure.

Referring to FIG. 1a, it shows a non-contact bearing of an embodiment of the present disclosure. In a suspended state, the non-contact bearing 1 is provided with a predetermined spacing D to a first guide surface 81. The non-contact bearing 1 includes: a bearing body 10 and a micro electro mechanical layer 12. The bearing body 10 includes a second guide surface 11, and the second guide surface 11 is opposite to the first guide surface 81. The micro electro mechanical layer 12 is disposed on the second guide surface 11, and includes at least one micro sensor (for example, multiple micro sensors 12a) and/or at least one micro actuator (for example, multiple micro actuators 12b). Referring to FIG. 1b, the micro sensors 12a and the micro actuators 12b can be arranged along a two-dimensional direction. The micro sensors 12a can be selected from a group consisting of a temperature sensor, a pressure sensor, a displacement sensor, and an accelerometer. The micro actuators 12b can be micro pumps and/or micro valves. The micro electro mechanical layer 12 further includes multiple conductive lines and an insulation layer (not shown in the figure), and the conductive lines are used to transmit signals of the micro sensor 12a and/or the multiple micro actuators 12b. In this embodiment, the non-contact bearing 1 can selectively further include: multiple spacers 13, also disposed on the second guide surface 11, so that when the non-contact bearing 1 is in a non-suspended state, the spacers 13 are in contact with the first guide surface 81. Because the thickness of the spacers 13 is greater than the thickness of the micro electro mechanical layer 12, the micro sensor 12a and/or the micro actuator 12b can be prevented from being in contact with the first guide surface 81. Materials of the spacers 13 can be the same as a material of the insulation layer of the micro electro mechanical layer 12. In another embodiment, the micro electro mechanical layer 12 can selectively further include: a protective layer (not shown in the figure), disposed on an outmost side of the micro electro mechanical layer 12, so that when the non-contact bearing 1 is in a non-suspended state, the protective layer is in contact with the first guide surface 81, and the micro sensor 12a and/or the micro actuator 12b can be prevented from being in contact with the first guide surface 81.

Figure 1C:
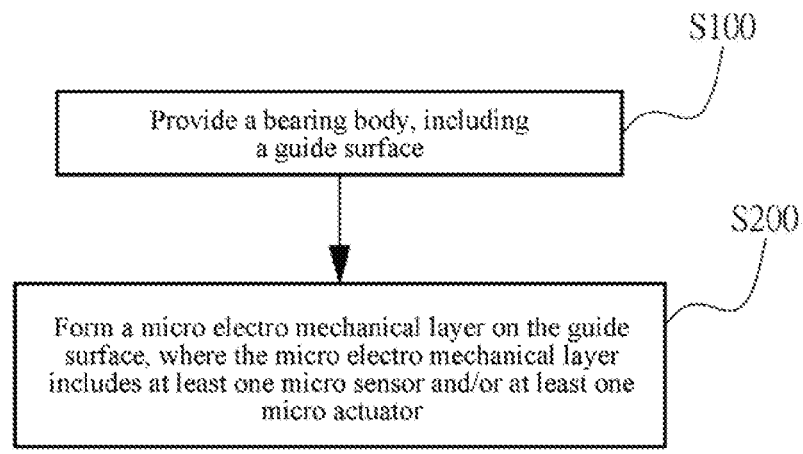
FIG. 1c is a flowchart of a method for manufacturing a non-contact bearing of an embodiment of the present disclosure.

Referring to FIG. 1c, it shows steps of a method for manufacturing a non-contact bearing according to an embodiment of the present disclosure. The method for manufacturing a non-contact bearing includes the following steps. Step S100: Provide a bearing body 10, including a guide surface (that is, a second guide surface 11). Step S200: Form a micro electro mechanical layer 12 on the guide surface, wherein the micro electro mechanical layer 12 includes at least one micro sensor (for example, multiple micro sensors 12a) and/or at least one micro actuator (for example, multiple micro actuators 12b), as shown in FIG. 1a.

Using the temperature sensor as an example, a thermocouple is a commonly used temperature sensor. A thermocouple thermometer is adapted to connect parts of two different metals (or metal wires) together into a loop in series for use. At a junction of the connection between the two metals, the two metals generate a micro voltage at a temperature. An amplitude of the voltage depends on types and the junction of the two metals. A microammeter can measure a weak current flowing through the two metals, and this is the Seebeck Effect. In other words, a thermocouple-type sensing component is a resistance thermometer using two groups of different materials, and acquires a voltage difference between two groups of resistance thermometers in a differential manner.

Figure 2A:
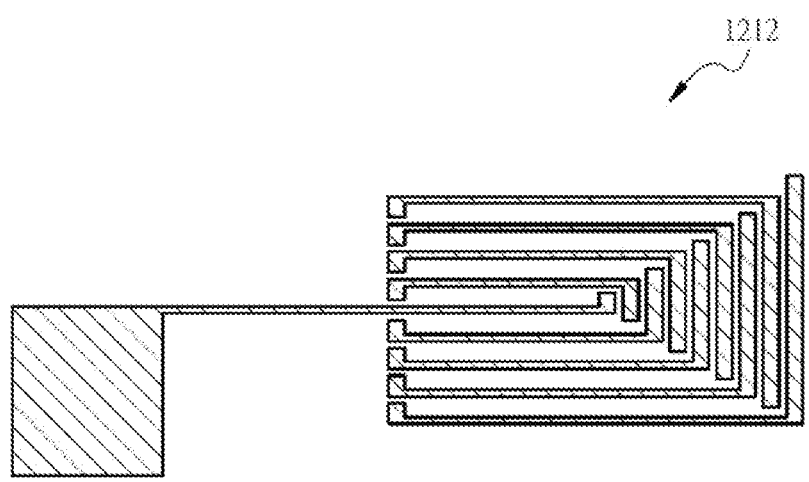
FIG. 2a is a schematic plan view of a first-layer metal pattern line of a temperature sensor of an embodiment of the present disclosure.
Figure 2B:
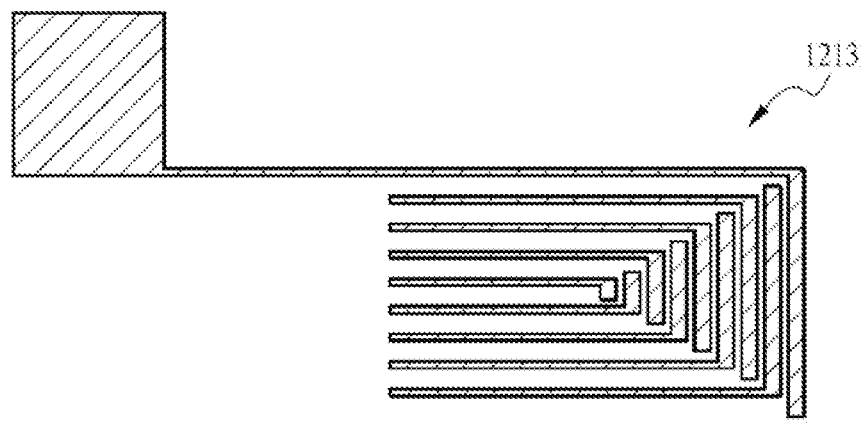
FIG. 2b is a schematic plan view of a second-layer metal pattern line of a temperature sensor of an embodiment of the present disclosure.
Figure 2C:
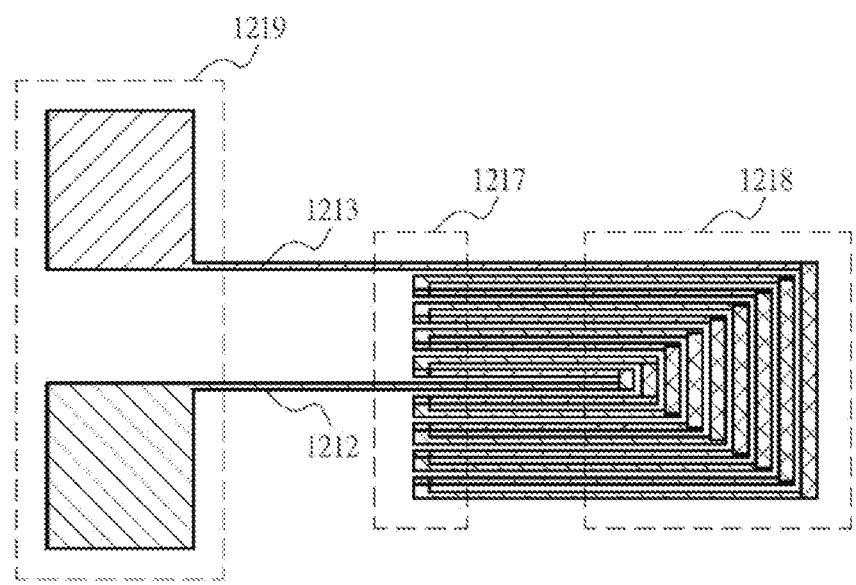
FIG. 2c is a schematic plan view of a completed series thermocouple pattern made of two metal layers of a temperature sensor according to an embodiment of the present disclosure.

FIG. 2a is a schematic plan view of a first-layer metal pattern line, FIG. 2b is a schematic plan view of a second-layer metal pattern line, and FIG. 2c is a schematic plan view of a completed series thermocouple patter made of two metal layers. Referring to FIG. 2a to FIG. 2c, in a thermocouple pattern that connects two metal layers (a first metal layer 1212 and a second metal layer 1213) in series, a hot-end temperature sensing area 1218 is an overlapping area of the first metal layer 1212 (for example, a nickel metal) and the second metal layer 1213 (for example, a copper metal), and a cold-end sensing area 1219 is a solder part, and a thermocouple series position 1217 is a series area of the first metal layer 1212 (for example, a nickel metal) and the second metal layer 1213 (for example, a copper metal), so as to form a structure of a thin-film temperature sensor, that is, the temperature sensor 121 of the present disclosure.

Copper and nickel metals are used as an example in the method for manufacturing a temperature sensor of the present disclosure, and descriptions are provided later referring to FIG. 3a to FIG. 3i.

Figure 3A:
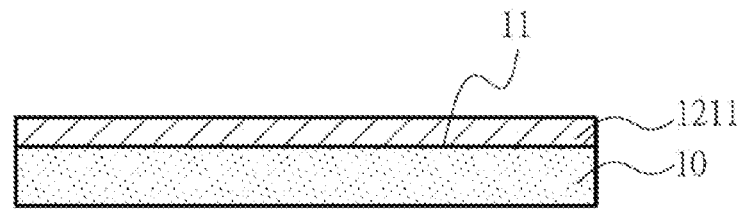
FIG. 3a to FIG. 3i are schematic sectional views of a method for manufacturing a temperature sensor according to an embodiment of the present disclosure.
Figure 3B:
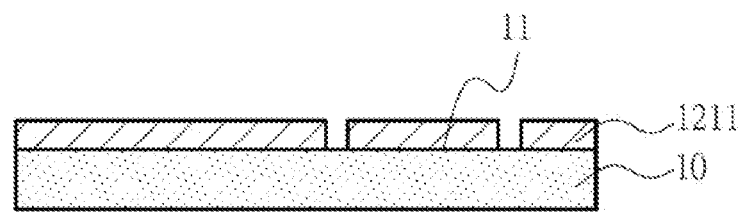

First, a bearing body 10 is provided. In this embodiment, a second guide surface 11 of the bearing body 10 can be a surface of a porous material layer or a surface of a regular channel substrate. A silicon nitride layer is formed on the bearing body 10 by using a chemical vapor deposition method and is used as an insulation layer 1211, as shown in FIG. 3a. Then, a photoresist (not shown in the figure) is coated on the silicon nitride layer 1211, and a lithography process is performed to expose and develop a to-be-etched pattern. Then, a part of silicon nitride 1211 not covered by the photoresist is etched, to form a first pattern. A pattern formed after the photoresist is removed is shown in FIG. 3b.

Figure 3C:
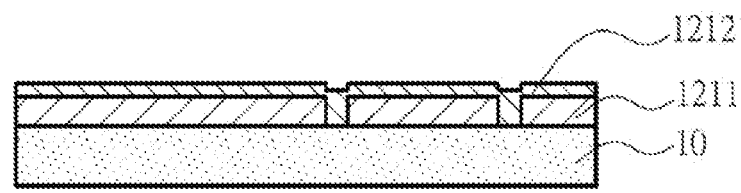
Figure 3D:
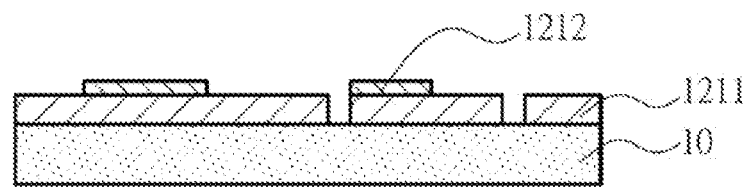

A first metal layer 1212 is evaporated on the insulation layer 1211, is a nickel metal in this embodiment, and is used as a metal resistance material of a first metal material of a thermocouple, as shown in FIG. 3c. A photoresist (not shown in the figure) is coated on the first metal layer 1212 (a nickel metal layer), and a lithography process is also performed, to expose and develop a first-layer thermocouple pattern. Then, the nickel metal is etched to form the first-layer thermocouple pattern. A pattern formed after the photoresist is removed is shown in FIG. 3d.

Figure 3E:
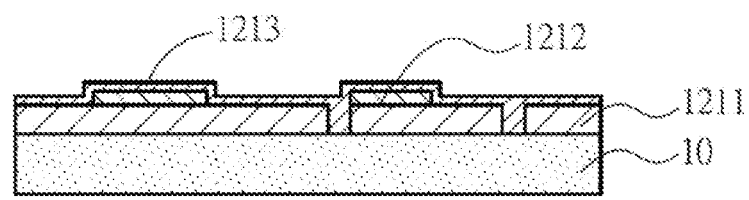
Figure 3F:
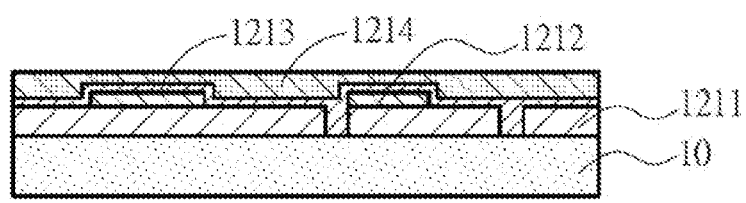
Figure 3G:
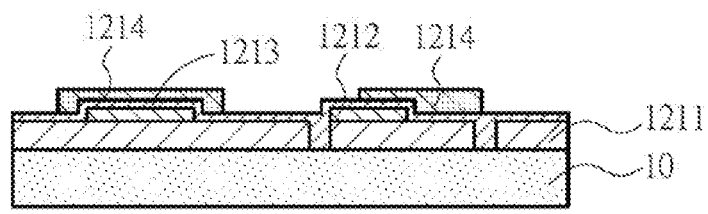
Figure 3H:
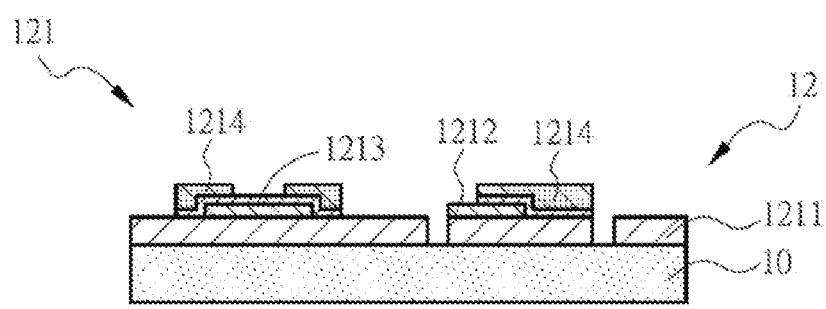
Figure 3I:
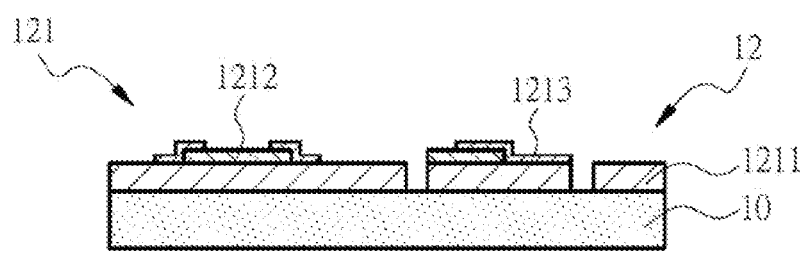

A copper metal layer is then evaporated on the first metal layer 1212 (the nickel metal layer), and is the second metal layer 1213. In this embodiment, the copper metal is used as a solder material of a second metal material of the thermocouple, as shown in FIG. 3e. A photoresist 1214 is then coated on the second metal layer 1213 (the copper metal), as shown in FIG. 3f. Then, a photomask with a second pattern is used to perform a lithography process on the photoresist 1214 is coated on the second metal layer 1213 (the copper metal), to expose and develop a second-layer thermocouple solder pattern, as shown in FIG. 3g. Then, the second metal layer 1213 (the copper metal) is etched, as shown in FIG. 3h, to form the second-layer thermocouple solder pattern, and then the photoresist 1214 is removed, so as to complete a thin-film temperature sensor, that is, the temperature sensor 121 (a part of the micro electro mechanical layer 12) of the present disclosure, as shown in FIG. 3i. When the thin-film temperature sensor is completed, multiple connection channels 1215 (the connection channels 1215 can be used for gas or liquid to pass through) are also completed. In addition, multiple processes (generally referred to as an exposure, development, and etching process) such as a photomask, a lithography process, exposure and development, etching, and removing of a photoresist, mentioned in the foregoing steps can also be replaced with a laser direct-writing process.

Therefore, according to the method for manufacturing a non-contact bearing of the present disclosure, by means of an exposure, development, etching process (including multiple exposure, development, and etching steps) and a thin-film formation process (including multiple thin-film formation steps), or by means of a laser direct-writing process (including multiple laser direct-writing steps) and a thin-film formation process (including multiple thin-film formation steps), at least one micro sensor and/or at least one micro actuator can be formed on the micro electro mechanical layer.

Figure 3J:
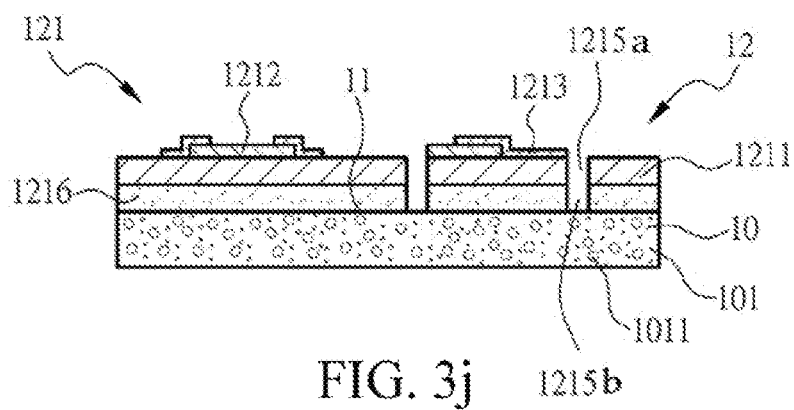
FIG. 3j is a schematic sectional view of a method for manufacturing a temperature sensor according to another embodiment of the present disclosure.

Referring to FIG. 3j, in another embodiment, when the bearing body 10 is a porous material layer 101, preferably, a photo imageable coverlay (PIC) 1216 can be first formed as an intermediate layer on the second guide surface 11 of the bearing body 10, and then a subsequent thin-film formation process is performed on the insulation layer 1211, the first metal layer 1212, and the second metal layer 1213, so as to increase an effect of adhering the temperature sensor 121 to the porous material layer 101. Therefore, according to the method for manufacturing a non-contact bearing of the present disclosure, a PIC is formed on the guide surface, and by means of an exposure, development, and etching process (including multiple exposure, development, and etching steps) and a thin-film formation process (including multiple thin-film formation steps), or by means of a laser direct-writing process (including multiple laser direct-writing steps) and a thin-film formation process (including multiple thin-film formation steps), at least one micro sensor and/or at least one micro actuator can be formed on the PIC.

Alternatively, a subsequent thin-film formation process is first performed on the insulation layer 1211, the first metal layer 1212, and the second metal layer 1213, and the temperature sensor 121 is formed on the PIC 1216, and then, by means of the PIC 1216, the temperature sensor 121 is adhered to the second guide surface 11 of the bearing body 10 (as shown in FIG. 3j) in a vacuum state, so that an effect of adhering the temperature sensor 121 to the porous material layer 101 can also be increased. Therefore, according to the method for manufacturing a non-contact bearing of the present disclosure, by means of an exposure, development, and etching process (including multiple exposure, development, and etching steps) and a thin-film formation process (including multiple thin-film formation steps), or by means of a laser direct-writing process (including multiple laser direct-writing steps) and a thin-film formation process (including multiple thin-film formation steps), at least one micro sensor and/or at least one micro actuator can be formed on the PIC. Then, the at least one micro sensor and/or the at least one micro actuator and the PIC are adhered to the second guide surface in a vacuum state.

Moreover, by means of a laser puncturing process, more connection channels 1215a and 1215b are selectively formed on the micro electro mechanical layer 12 and the PIC 1216, and can be sequentially communicated with micro holes 1011 of the porous material layer 101.

Figure 3K:
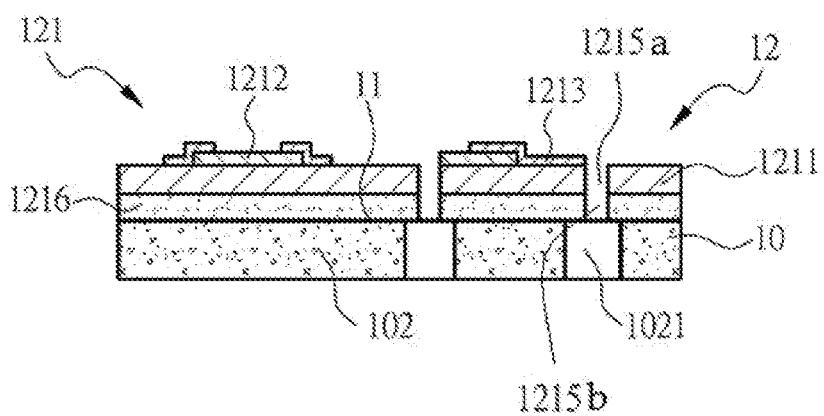
FIG. 3k is a schematic sectional view of a method for manufacturing a temperature sensor according to still another embodiment of the present disclosure.

Referring to FIG. 3k, in still another embodiment, when the bearing body 10 is the regular channel substrate 102, by means of the laser puncturing process, more connection channels 1215a and 1215b can be selectively formed on the micro electro mechanical layer 12 and the PIC 1216, to communicate with multiple micro channels 1021 of the regular channel substrate 102.

Figure 4A:
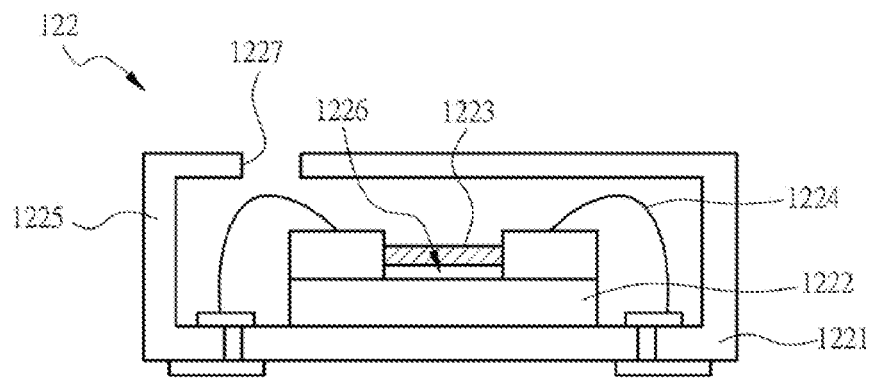
FIG. 4a is a schematic sectional view of a pressure sensor according to an embodiment of the present disclosure.
Figure 4B:
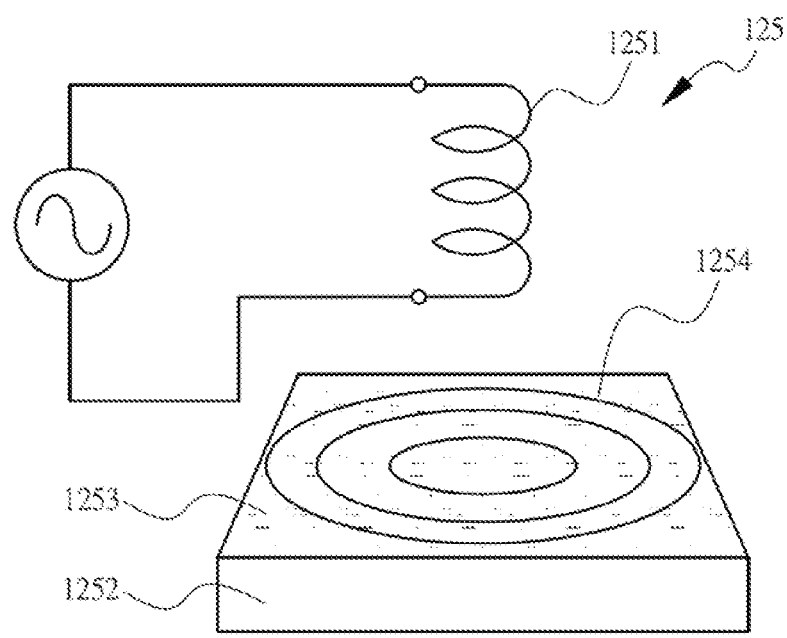
FIG. 4b is a schematic sectional view of a displacement sensor according to an embodiment of the present disclosure.

Referring to FIG. 4a and FIG. 1a, using a pressure sensor 122 as an example, the pressure sensor 122 includes a substrate 1221, a micro sensing component 1222, a sensing film 1223, multiple bonding wires 1224, and a cover 1225. The micro sensing component 1222 is disposed on the substrate 1221. The sensing film 1223 is disposed on the micro sensing component 1222, and a chamber 1226 is formed between the sensing film 1223 and the micro sensing component 1222. The bonding wire 1224 is used to electrically connect the sensing film 1223 to the substrate 1221. The cover 1225 is disposed on the substrate 1221, and covers the micro sensing component 1222. The cover 1225 is provided with an opening 1227, so that outside gas or a hydraulic pressure can enter the cover 1225. The chamber 1226 itself has a fixed pressure. When an outside pressure presses the sensing film 1223, a pressure difference is generated between the outside pressure and the pressure in the chamber 1226, and can be obtained through measurement by means of the micro sensing component 1222. Then, a signal is transmitted to the substrate 1221 by using the bond wire 1224. The substrate 1221 is disposed on the non-contact bearing that is to be applied, so that a pressure sensing loop can be formed. In this embodiment, the pressure sensor 122 (a part of the micro electro mechanical layer 12) can be disposed on the second guide surface 11 of the bearing body 10 or the foregoing PIC. Referring to FIG. 4b and FIG. 1a, using the displacement sensor 125 as an example, the displacement sensor 125 includes a coil 1251. The displacement sensor 125 is mainly to measure a displacement amount between the displacement sensor 125 and a metal surface 1253 (that is, the first guide surface 81) of a to-be-measured device 1252. A sensing principle is that a magnetic line of the coil 1251 of the displacement sensor 125 induces the metal surface 1253 of the to-be-measured device 1252 to generate an eddy current 1254, and when the displacement amount is increased, the eddy current 1254 is decreased; when the displacement amount is decreased, the eddy current 1254 is increased, so as to calculate the displacement amount. In this embodiment, the displacement sensor (a part of the micro electro mechanical layer 12) can be disposed on the second guide surface 11 of the bearing body 10 or the foregoing PIC.

Figure 4C:
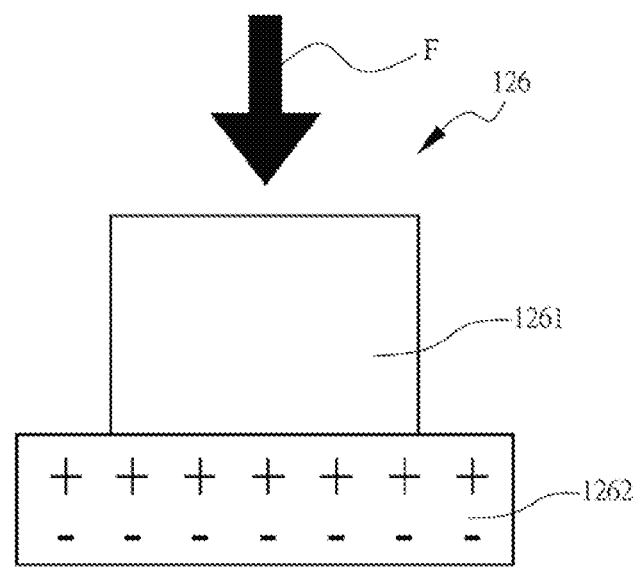
FIG. 4c is a schematic sectional view of an accelerometer according to an embodiment of the present disclosure.

Referring to FIG. 4c and FIG. 1a, using the accelerometer 126 as an example, the accelerometer 126 includes a mass block 1261 and a piezoelectric material 1262. Displacement of the mass block 1261 deforms the piezoelectric material 1262 to release charge, a force F of the mass block 1261 is then calculated according to a charge release amount, and an acceleration of the mass block 1261 is further calculated. In this embodiment, the mass block 1261 can be a part of the bearing body 10, the piezoelectric material 1262 can be a part of the micro electro mechanical layer 12, and the piezoelectric material 1262 of the accelerometer 126 can be disposed on the second guide surface 11 of the bearing body 10 or the foregoing PIC.

Figure 5:
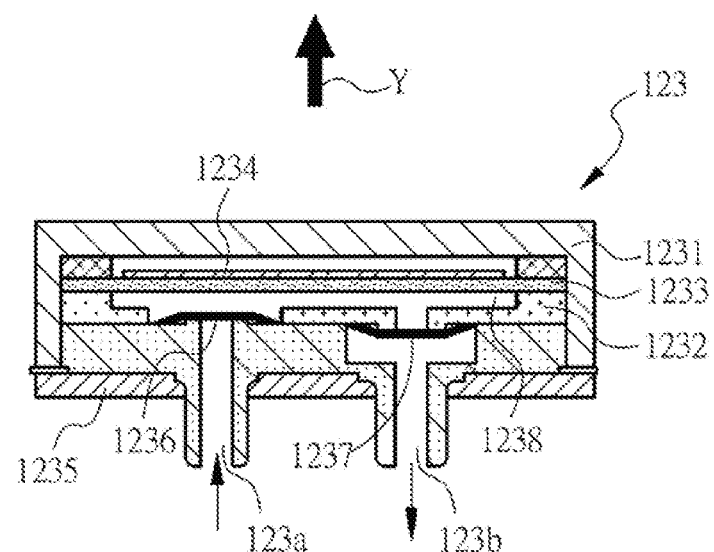
FIG. 5 is a schematic sectional view of a micro pump according to an embodiment of the present disclosure.

Referring to FIG. 5 and FIG. 1a, using the micro pump 123 as an example, a micro pump is a micro fluid piezoelectric apparatus that combines a piezoelectric actuator and a diaphragm/membrane micro pump technology. The micro pump 123 includes a valve seat 1231, a valve body 1232, a valve body film 1233, a piezoelectric actuator 1234, a cover body 1235, an inlet valve 1236, and an outlet valve 1237. The cover body 1235 includes an inlet channel 123a and an outlet channel 123b. A pressure chamber 1238 is defined between the valve body 1232 and the piezoelectric actuator 1234. The valve body film 1233 is disposed between the valve seat 1231 and the valve body 1232. In this embodiment, when the non-contact bearing is a fluid bearing, the valve seat 1231 can be disposed on the second guide surface 11 of the bearing body 10 or disposed on the foregoing PIC, that is, can be used as a main supply source of gas or liquid. If a quantity of micro pumps is sufficient, the non-contact bearing 1 can be independently used to generate a suspension characteristic. In another embodiment, the micro pump 123 can be used as a secondary supply source of gas or liquid. The micro pump 123 can be disposed at a position that is on the second guide surface 11 and that has no micro hole 1011 or has no micro channel 1021, to prevent the micro pump 123 from blocking gas or liquid from the micro holes 1011 or the micro channels 1021 of the second guide surface 11 of the bearing body 10 and affecting the suspension characteristic of the non-contact bearing 1.

For example, when a voltage acts on upper and lower electrodes of the piezoelectric actuator 1234, an electric field is generated, so that the piezoelectric actuator 1234 bends under the action of the electric field. When the piezoelectric actuator 1234 bends and deforms in a direction indicated by an arrow Y, a volume of the pressure chamber 1238 is increased, to generate a suction to open the inlet valve 1236 of the valve body film 1233, so that a fluid can be absorbed from the inlet channel 123a on the valve seat 1231, and flow through the inlet valve 1236 into the pressure chamber 1238. On the contrary, when the piezoelectric actuator 1234 bends and deforms in an opposite direction of the arrow Y because a direction of the electric field changes, the volume of the pressure chamber 1238 is compressed, so that the pressure chamber 1238 generates a thrust to the fluid inside, and the inlet valve 1236 and the outlet valve 1237 bear the thrust in the opposite direction of the arrow Y. In this case, the outlet valve 1237 is opened, and the fluid flows through the pressure chamber 1238 from the outlet valve 1237, and flows out of the micro pump 123 through the outlet channel 123b of the valve seat 1231, so as to complete a transmission process of the fluid.

Figure 6:
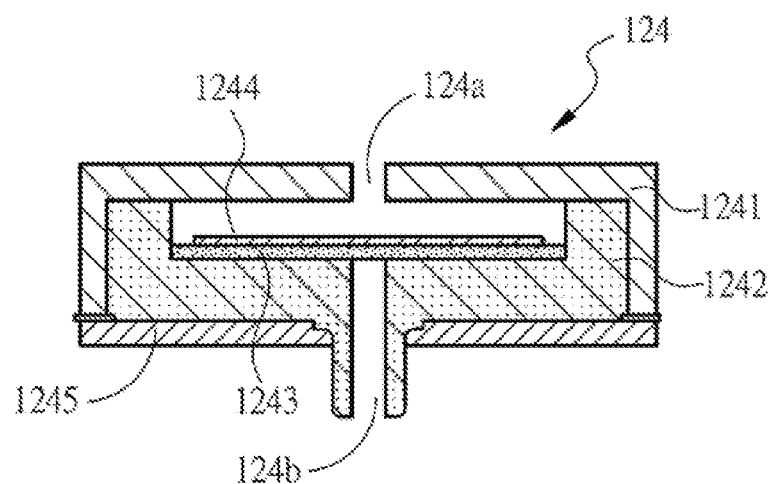
FIG. 6 is a schematic sectional view of a micro valve according to an embodiment of the present disclosure.

For example, the micro valve 124 can be similar to the structure of the micro pump. Referring to FIG. 6 and FIG. 1a, the micro valve 124 includes a valve seat 1241, a valve body 1242, a valve body film 1243, a piezoelectric actuator 1244, and a cover body 1245. The valve seat 1241 includes an inlet channel 124a, and the cover body 1245 includes an outlet channel 124b. The valve body film 1243 is disposed between the valve seat 1241 and the valve body 1242. When a voltage acts on upper and lower electrodes of the piezoelectric actuator 1244, the micro valve 124 is opened, so that the inlet channel 124a is in communication with the outlet channel 124b. On the contrary, when no voltage acts on the upper and lower electrodes of the piezoelectric actuator 1244, the micro valve 124 is closed. The micro valve 124 is a normally closed micro valve. As long as the micro valve 124 is disposed at a position corresponding to the micro holes 1011 of the porous material layer 101 of the bearing body 10 or a position corresponding to the micro channels 1021 of the regular channel substrate 102 of the bearing body 10, it can control whether the gas or liquid flows out of the bearing body 10.

The non-contact bearing of the present disclosure can be a fluid bearing or a magnetic bearing. The fluid bearing can be selected from a group consisting of a gas hydrostatic bearing, a liquid hydrostatic bearing, a gas hydrodynamic bearing, and a liquid hydrodynamic bearing.

Figure 7:
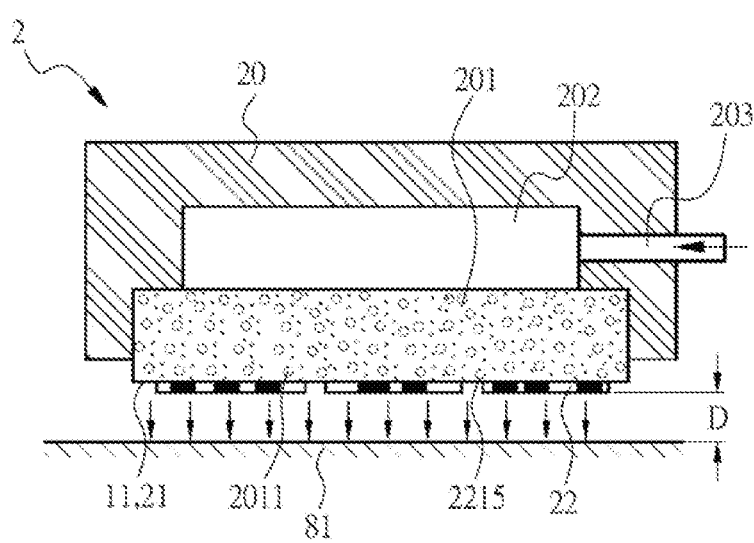
FIG. 7 is a schematic sectional view of a gas hydrostatic bearing according to an embodiment of the present disclosure.
Figure 8:
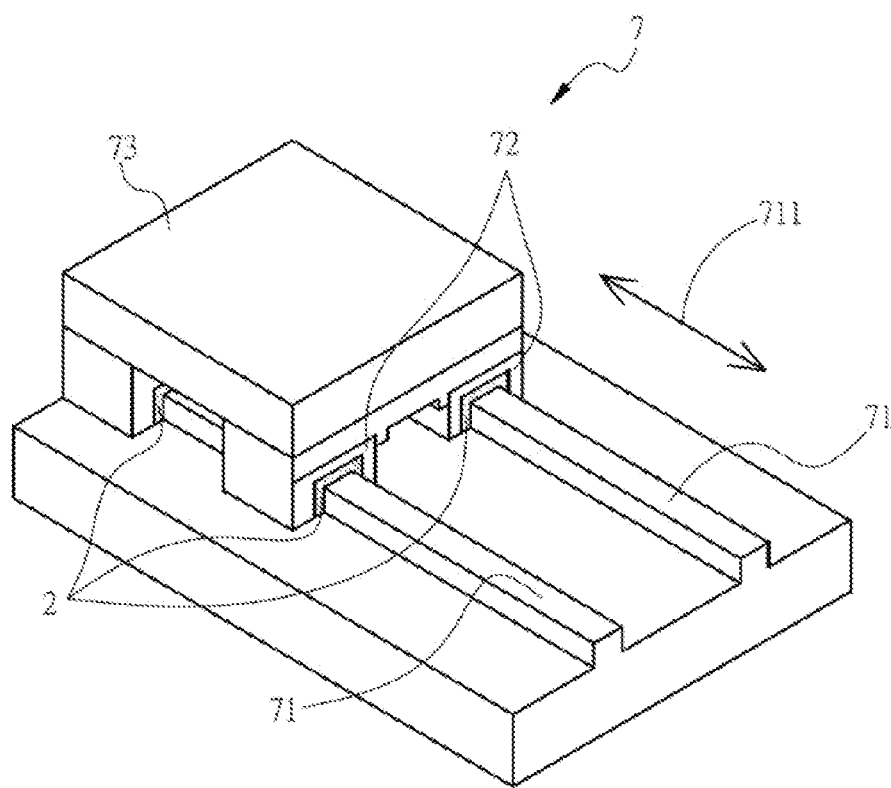
FIG. 8 is a schematic three-dimensional view of an apparatus having a slide/rail component of the present disclosure.

Referring to FIG. 7, in a first implementation of the present disclosure, when the non-contact bearing is a gas hydrostatic bearing 2 or a gas hydrodynamic bearing, a bearing body 20 of the gas hydrostatic bearing 2 includes a porous material layer 201, a cavity portion 202, and a gas inlet 203. Micro holes 2011 of the porous material layer 201, the cavity 202, and the gas inlet 203 are sequentially in communication, and the micro holes 2011 of the porous material layer 201 pass through the second guide surface 11, so as to make gas pass through the gas inlet 203, the cavity portion 202, and the micro holes 2011 of the porous material layer 201, and then flow into a predetermined spacing D between the gas hydrostatic bearing 2 (that is, the non-contact bearing) and the first guide surface 81 through multiple connection channels 2215 of the micro electro mechanical layer 22, so as to generate a suspension effect. In this embodiment, a surface 21 of the porous material layer 201 is the second guide surface 11. For example, referring to FIG. 8, the gas hydrostatic bearing 2 can be applied to an apparatus 7 having a slide/rail component. In other words, the non-contact bearing (the gas hydrostatic bearing 2) is disposed on a slider 72 that can move along a guide rail 71, and the first guide surface 81 is a surface 712 of the guide rail 71. The apparatus 7 can be applied to a machine tool or a precision machine. The machine tool or the precision machine (for example: an exposure machine in an optoelectronic semiconductor device, an ultra-precision lathe and an ultra precision machining center for manufacturing an ultra-precision mold, or a positioning carrier in an ultra-precision measurement device) uses the guide rail 71, the gas hydrostatic bearing 2, and the slider 72 to make a work platform 73 perform a straight line movement in a direction 711 of the guide rail 71 with an extremely small frictional force, thereby improving convenience on machining.

Figure 9:
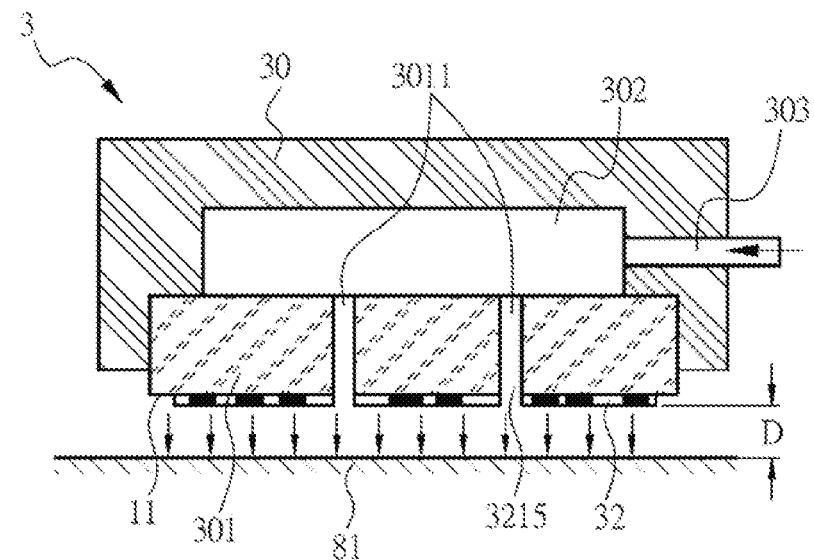
FIG. 9 is a schematic sectional view of a liquid hydrostatic bearing according to an embodiment of the present disclosure.

Referring to FIG. 9, in a second implementation of the present disclosure, when the non-contact bearing is a liquid hydrostatic bearing 3 or a liquid hydrodynamic bearing, a bearing body 30 of the liquid hydrostatic bearing 3 includes a regular channel substrate 301, a cavity portion 302, and a liquid inlet 303. Multiple micro channels 3011 of the regular channel substrate 301, the cavity portion 302, and the liquid inlet 303 are sequentially in communication, and the micro channels 3011 pass through the second guide surface 11, so as to make liquid pass through the liquid inlet 303, the cavity portion 302, and the micro channels 3011, and then flow into a predetermined spacing D between the liquid hydrostatic bearing 3 (the non-contact bearing) and the first guide surface 81 through the connection channel 3215 of the micro electro mechanical layer 32, so as to generate a suspension effect. For example, the liquid hydrostatic bearing can also be applied to the foregoing slide/rail component. In other words, the liquid hydrostatic bearing (the non-contact bearing) is disposed on a slider, and the first guide surface is a surface of a guide rail. Although the liquid hydrostatic bearing 3 uses liquid as a medium for generating a suspension effect, the liquid does not contaminate the micro electro mechanical layer 32 or invalidate the micro electro mechanical layer 32, because a protective layer (not shown in the figure) is disposed on an outer surface of the micro electro mechanical layer 32, and used to isolate the liquid.

Figure 10:
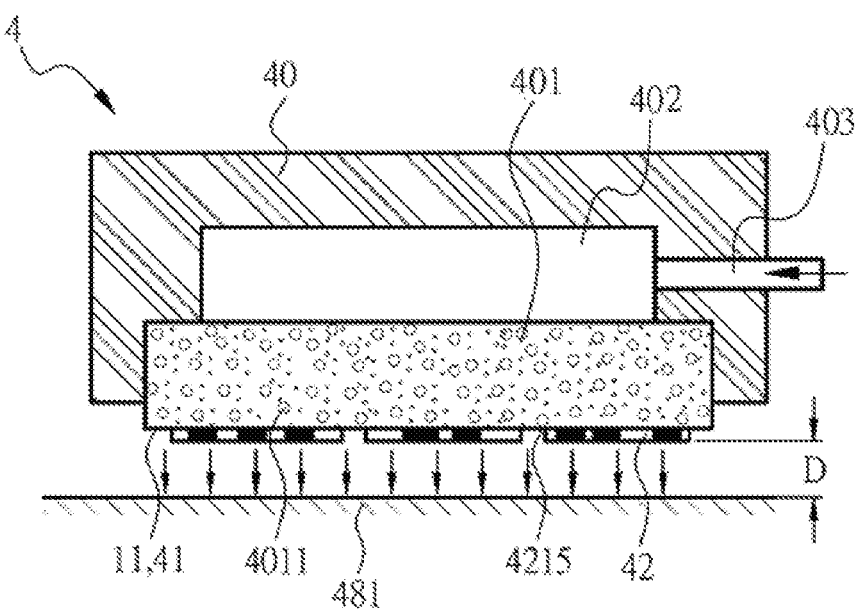
FIG. 10 is a schematic sectional view of a gas hydrodynamic bearing according to an embodiment of the present disclosure.
Figure 11:
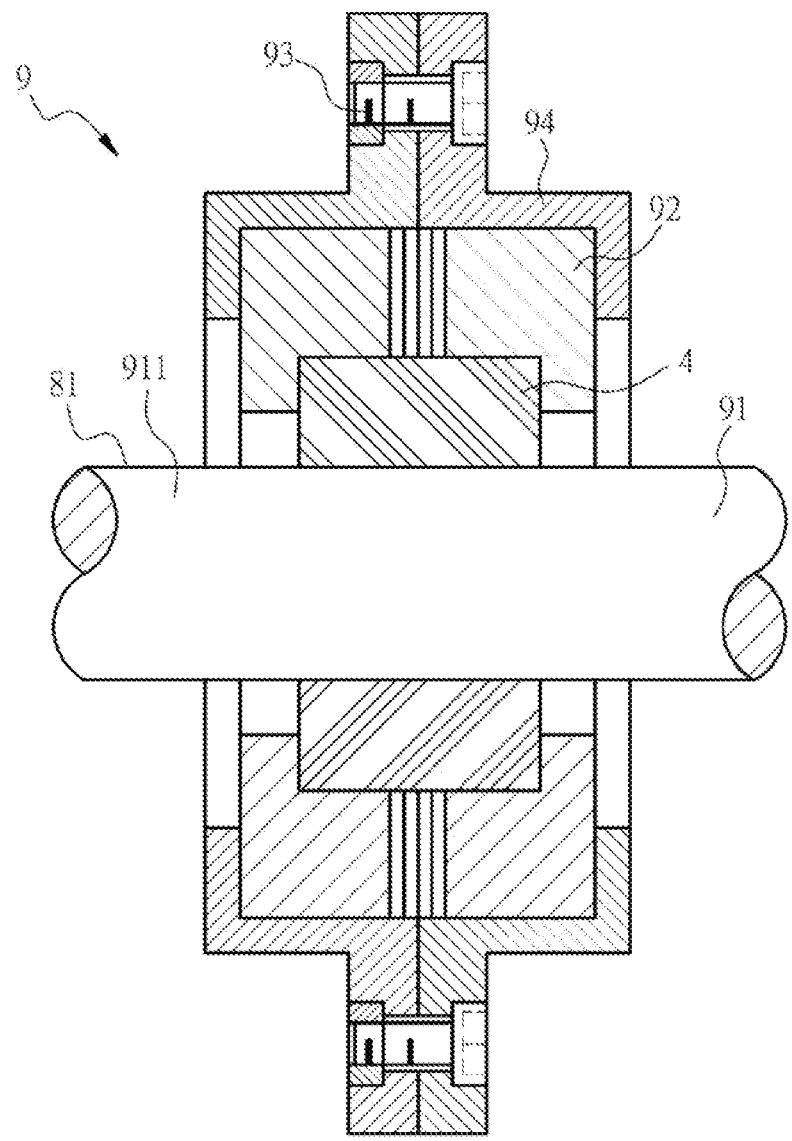
FIG. 11 is a schematic sectional view of an apparatus having a rotating component of an embodiment of the present disclosure.

Referring to FIG. 10, in a third implementation of the present disclosure, when the non-contact bearing is a liquid hydrostatic bearing or a liquid hydrodynamic bearing 4, a bearing body 40 of the liquid hydrodynamic bearing 4 includes a porous material layer 401, a cavity portion 402, and a liquid inlet 403. Multiple micro holes 4011 of the porous material layer 401, the cavity portion 402, and the liquid inlet 403 are sequentially in communication. A surface 41 of the porous material layer 401 is the second guide surface 11, and the micro holes 4011 pass through the second guide surface 11, so as to make liquid pass through the liquid inlet 403, the cavity portion 402, and the micro holes 4011, and then flow into a predetermined spacing D between the liquid hydrodynamic bearing 4 (the non-contact bearing) and the first guide surface 81 through a connection channel 4215 of the micro electro mechanical layer 42, so as to generate a suspension effect. For example, referring to FIG. 11, the liquid hydrodynamic bearing 4 can be applied to an apparatus 9 having a rotating component. In other words, the liquid hydrodynamic bearing 4 (the non-contact bearing) is disposed on a supporting shaft sleeve 92, and the first guide surface 81 is a surface 911 of a rotating shaft 91. The supporting shaft sleeve 92 covers and limits the liquid hydrodynamic bearing 4. At least one locking component 93 folds and locks multiple corresponding casings 94 to fix the supporting shaft sleeve 92. By means of the supporting shaft sleeve 92 and the liquid hydrodynamic bearing 4, the apparatus 9 can make the rotating shaft 92 perform a rotational movement with an extremely small friction force.

Figure 12:
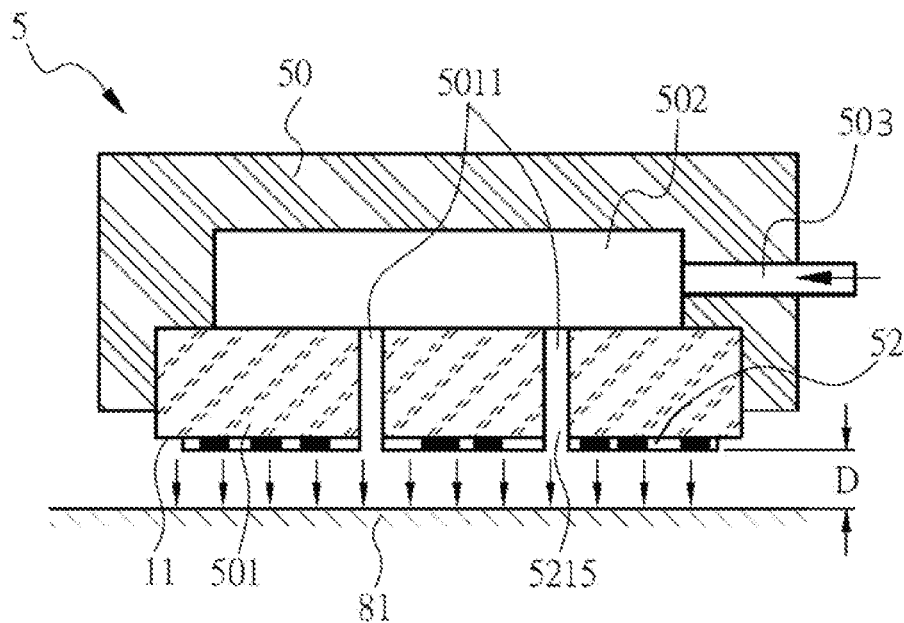
FIG. 12 is a schematic sectional view of a liquid hydrodynamic bearing according to an embodiment of the present disclosure.

Referring to FIG. 12, in a fourth implementation of the present disclosure, when the non-contact bearing is a gas hydrostatic bearing or a gas hydrodynamic bearing 5, a bearing body 50 of the gas hydrodynamic bearing 5 includes at least one regular channel substrate 501, a cavity portion 502, and a gas inlet 503. Multiple micro channels 5011 of the regular channel substrate 501, the cavity portion 502, and the gas inlet 503 are sequentially in communication. The micro channels 5011 pass through the second guide surface 11, so as to make gas pass through the gas inlet 503, the cavity portion 502, and the micro channels 5011, and then flow into a predetermined spacing D between the gas hydrodynamic bearing 5 (the non-contact bearing) and the first guide surface 81 through the connection channel 5215 of the micro electro mechanical layer 52, so as to generate a suspension effect. For example, the gas hydrodynamic bearing 5 can also be applied to an apparatus having a rotating component In other words, the gas hydrodynamic bearing 5 (the non-contact bearing) is disposed on a supporting shaft sleeve, and the first guide surface is a surface of a rotating shaft.

Figure 13:
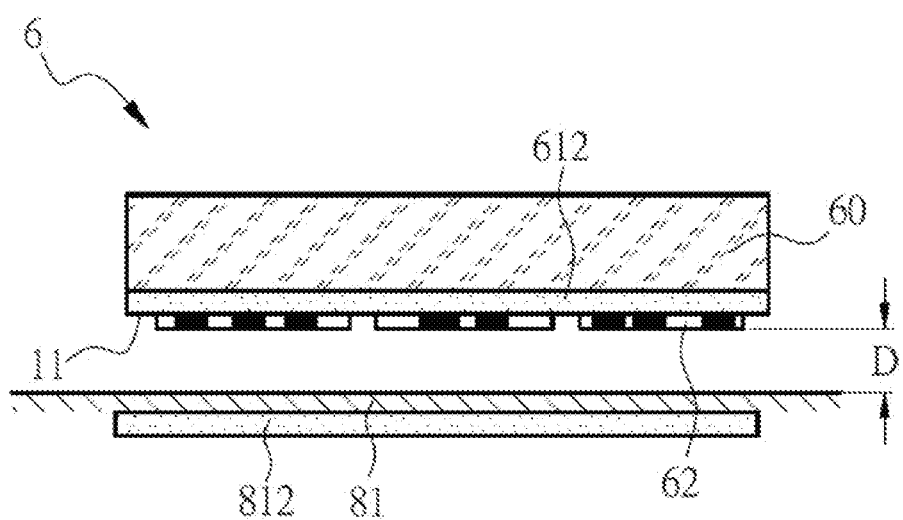
FIG. 13 is a schematic sectional view of a magnetic bearing according to an embodiment of the present disclosure.

Referring to FIG. 13, in a fifth implementation of the present disclosure, when the non-contact bearing is a magnetic bearing 6, the magnetic bearing 6 is disposed with a predetermined spacing D to a first guide surface 81. The magnetic bearing 6 includes: a bearing body 60 and a micro electro mechanical layer 62. The first guide surface 81 is provided with a first magnetic area 812, a second guide surface 11 of the bearing body 60 is further provided with a second magnetic area 612, and the first magnetic area 812 and the second magnetic area 612 have same magnetism. Both the first magnetic area 812 and the second magnetic area 612 can be S-pole, or both the first magnetic area 812 and the second magnetic area 612 can be N-pole. The magnetic bearing 6 uses a magnetic repulsion of predetermined magnetic pole arrangement of the first magnetic area 812 and the second magnetic area 612, to generate a magnetic suspension effect. For example, the magnetic bearing 6 can also be applied to the foregoing slide/rail component. In other words, the magnetic bearing 6 (the non-contact bearing) is disposed on a slider, and the first guide surface 81 is a surface of a guide rail. For another example, the magnetic bearing 6 can also be applied to an apparatus having a rotating component. In other words, the magnetic bearing 6 (the non-contact bearing) is disposed on a supporting shaft sleeve, and the first guide surface is a surface of a rotating shaft.

During measurement, multiple micro sensors and/or multiple micro actuators of the present disclosure are disposed on a surface (that is, a guide surface) of a non-contact bearing, and thus: (1) by means of the micro sensors, correct and sufficient data can be obtained from the surface of the non-contact bearing in real time and directly for monitoring and analyzing, and (2) by means of the micro actuators, a feedback control adjustment policy can be performed on the surface of the non-contact bearing.

The foregoing descriptions are merely implementations or embodiments recording the technical means used in the present disclosure to resolve the problems, but are not used to limit the scope of the patent implementation of the present disclosure. That is, any variations or modifications conforming to the patent application scope of the present disclosure, or made without departing from the patent scope of the present disclosure shall fall within the patent scope of the present disclosure.

What is claimed is:

1. A non-contact bearing, wherein in a suspended state, the non-contact bearing is disposed with a predetermined spacing to a first guide surface, and the non-contact bearing comprises:
   a bearing body, comprising a second guide surface, wherein the second guide surface is opposite to the first guide surface; and
   a micro electro mechanical layer, disposed on the second guide surface, and comprising at least one micro sensor and/or at least one micro actuator.

2. The non-contact bearing according to claim 1, wherein the micro sensors are selected from a group consisting of a temperature sensor, a pressure sensor, a displacement sensor, and an accelerometer.

3. The non-contact bearing according to claim 1, wherein the micro actuator is a micro pump and/or a micro valve.

4. The non-contact bearing according to claim 1, further comprising: multiple spacers, also disposed on the second guide surface, so that when the non-contact bearing is in a non-suspended state, the spacers are adapted to be in contact with the first guide surface.

5. The non-contact bearing according to claim 4, wherein the thickness of the spacers is greater than the thickness of the micro electro mechanical layer.

6. The non-contact bearing according to claim 1, wherein:
   when the non-contact bearing is a gas hydrostatic bearing or a gas hydrodynamic bearing, the bearing body comprises a porous material layer, a cavity portion, and a gas inlet, wherein multiple micro holes of the porous material layer, the cavity portion, and the gas inlet are sequentially in communication, a surface of the porous material layer is the second guide surface, and the micro holes pass through the second guide surface, so as to make gas pass through the gas inlet, the cavity portion, and the micro holes, and flow into the predetermined spacing between the non-contact bearing and the first guide surface.

7. The non-contact bearing according to claim 6, wherein the non-contact bearing is disposed on a slider that is adapted to move along a guide rail, and the first guide surface is a surface of the guide rail.

8. The non-contact bearing according to claim 6, wherein the micro electro mechanical layer is provided with multiple connection channels adapted to communicate with the micro holes of the porous material layer, so as to make the gas flow into the predetermined spacing between the non-contact bearing and the first guide surface through the micro holes and the connection channels.

9. The non-contact bearing according to claim 1, wherein:
when the non-contact bearing is a liquid hydrostatic bearing or a liquid hydrodynamic bearing, the bearing body comprises a regular channel substrate, a cavity portion, and a liquid inlet, wherein multiple micro channels of the regular channel substrate, the cavity portion, and the liquid inlet are sequentially in communication, a surface of the regular channel substrate is the second guide surface, and the micro channels pass through the second guide surface, so as to make liquid pass through the liquid inlet, the cavity portion, and the micro channels, and flow into the predetermined spacing between the non-contact bearing and the first guide surface.

10. The non-contact bearing according to claim 9, wherein the non-contact bearing is disposed on a slider that is adapted to move along a guide rail, and the first guide surface is a surface of the guide rail.

11. The non-contact bearing according to claim 9, wherein the micro electro mechanical layer is provided with multiple connection channels adapted to communicate with the micro channels of the regular channel substrate, so as to make the liquid flow into the predetermined spacing between the non-contact bearing and the first guide surface through the micro channels and the connection channels.

12. The non-contact bearing according to claim 1, wherein:
when the non-contact bearing is a gas hydrostatic bearing or a gas hydrodynamic bearing, the bearing body comprises a regular channel substrate, a cavity portion, and a gas inlet, wherein multiple micro channels of the regular channel substrate, the cavity portion, and the gas inlet are sequentially in communication, a surface of the regular channel substrate is the second guide surface, and the micro channels pass through the second guide surface, so as to make gas pass through the gas inlet, the cavity portion, and the micro channels, and flow into the predetermined spacing between the non-contact bearing and the first guide surface.

13. The non-contact bearing according to claim 12, wherein the non-contact bearing is disposed on a supporting shaft sleeve, and the first guide surface is a surface of a rotating shaft.

14. The non-contact bearing according to claim 12, wherein the micro electro mechanical layer is provided with multiple connection channels adapted to communicate with the micro channels of the regular channel substrate, so as to make the gas flow into the predetermined spacing between the non-contact bearing and the first guide surface through the micro channels and the connection channels.

15. The non-contact bearing according to claim 1, wherein:
when the non-contact bearing is a liquid hydrostatic bearing or a liquid hydrodynamic bearing, the bearing body comprises a porous material layer, a cavity portion, and a liquid inlet, wherein multiple micro holes of the porous material layer, the cavity portion, and the liquid inlet are sequentially in communication, a surface of the porous material layer is the second guide surface, and the micro holes passes through the second guide surface, so as to make liquid pass through the liquid inlet, the cavity portion, and the micro holes, and flow into the predetermined spacing between the non-contact bearing and the first guide surface.

16. The non-contact bearing according to claim 15, wherein the non-contact bearing is disposed on a supporting shaft sleeve, and the first guide surface is a surface of a rotating shaft.

17. The non-contact bearing according to claim 15, wherein the micro electro mechanical layer is provided with multiple connection channels adapted to communicate with the micro holes of the porous material layer, so as to make the liquid flow into the predetermined spacing between the non-contact bearing and the first guide surface through the micro holes and the connection channels.

18. The non-contact bearing according to claim 1, wherein:
when the non-contact bearing is a magnetic bearing, the first guide surface is provided with a first magnetic area, the second guide surface is further provided with a second magnetic area, and the first magnetic area and the second magnetic area have same magnetism.

19. The non-contact bearing according to claim 18, wherein the non-contact bearing is disposed on a slider that is adapted to move along a guide rail, and the first guide surface is a surface of the guide rail.

20. The non-contact bearing according to claim 18, wherein the non-contact bearing is disposed on a supporting shaft sleeve, and the first guide surface is a surface of a rotating shaft.

* * * * *